Patented June 19, 1945

2,378,881

UNITED STATES PATENT OFFICE 2,378,881

EXTENSION OF RUBBER

Francis E. Cislak, Indianapolis, Ind., assignor to Reilly Tar & Chemical Corporation, Indianapolis, Ind., a corporation of Indiana No Drawing. Application February 5, 1943, Serial No. 474,849

2 Claims. (Cl. 260—36)

This invention relates to a new rubber extender, to the method of effectively utilizing it, and to new rubber material and rubber products embodying it.

In these critical times, every effort is being made to extend our small and dwindling rubber supply. Extensive research is being conducted to find ways of making that rubber supply go farther.

My present invention does that.

I have found that by incorporating a small amount of acenaphthylene in a larger amount of a rubber—by which term I mean a sulfur vulcanizable rubber, including both natural rubber and so-called synthetic rubbers of the Buna S (butadiene-styrene copolymer), Buna N (butadiene-acrylonitrile copolymer), and copolymers of vinyl pyridines and butadiene—there is obtained an increased amount of rubber material; and that on vulcanizing that rubber material a vulcanized rubber product is obtained which has properties not undesirably altered from those of the vulcanized rubber itself, and in some cases even better than those of the vulcanized rubber itself. The amount of acenaphthylene may be anything up to about 50% by weight of the amount of the rubber.

For instance, I have found that by incorporating 25 parts of acenaphthylene in 100 parts of raw crepe rubber, with such other ingredients as are necessary or common in vulcanizing, and vulcanizing the mixture, the resultant vulcanized rubber product has increased elongation and increased tensile strength as compared with a product exactly similar save for the omission of the acenaphthylene.

Similarly, I have found that by incorporating 20–30 parts of acenaphthylene in 100 parts of a synthetic rubber of the type of Buna S, Buna N, and copolymers of vinylpyridines and butadiene (described in the co-pending application of William H. Rieger and myself, Serial No. 450,920, filed July 14, 1942), and also putting in the mixture necessary or desirable ingredients for vulcanization, upon such vulcanization a product is obtained which has increased softness and increased elongation as compared with exactly the same product with the acenaphthylene left out.

The following are examples of my invention:

Example 1

Raw crepe rubber is compounded, on ordinary rubber rolls, in accordance with the following formula:

| | Parts |
|---|---|
| Crepe rubber | 100 |
| Stearic acid | 4 |
| Zinc oxide | 5 |
| Carbon | 25 |
| Acenaphthylene | 25 |
| Sulfur | 3 |
| Mercaptobenzothiazole | 1 |
| | 163 |

The compounded rubber so produced is vulcanized under pressure for one hour at about 140 to 145° C.

The vulcanized rubber product thus obtained, containing acenaphthylene as noted, is found to have a higher elongation and a higher tensile strength than has an exactly corresponding rubber composition with the acenaphthylene omitted.

Thus the rubber product is not only increased in amount over that obtained when the acenaphthylene is omitted, but the product is better both in tensile strength and in elongation.

Example 2

A synthetic rubber of the Buna N type, such as the so-called Hycar OR–15, is compounded on ordinary rubber rolls in accordance with the following formula:

| | Parts |
|---|---|
| Hycar OR–15 | 100 |
| Stearic acid | 2 |
| Zinc oxide | 10 |
| Channel black | 50 |
| Acenaphthylene | 40 |
| Mercaptobenzothiazole | 1 |
| Sulfur | 1 |
| | 204 |

The compounded rubber so obtained is vulcanized under pressure for about one hour at about 140–145° C.

The vulcanized rubber product so obtained has greater elongation and is softer than is an otherwise exactly corresponding rubber product with the acenaphthylene omitted.

Thus in this example also the amount of rubber product is increased, and at the same time the vulcanized rubber product has greater elongation and greater softness.

*Example 3*

Example 2 is repeated, save that instead of using a synthetic rubber of the Buna N type, I use a synthetic rubber of the Buna S type, for instance the so-called Hycar OS-20. The vulcanized rubber product thus obtained, like that obtained under Example 2, has greater elongation and greater softness than has a corresponding rubber product which is otherwise exactly the same save that the acenaphthylene is omitted.

*Example 4*

Examples 2 and 3 are repeated, save that instead of using a synthetic rubber of the Buna N or Buna S type, I use a synthetic rubber of the type shown in the aforesaid Cislak & Rieger patent application—that is, a copolymer of a vinylpyridine and butadiene. Here again, as in Examples 2 and 3, the product containing the acenaphthylene has increased softness and increased elongation over exactly the same product with the acenaphthylene omitted.

I claim as my invention.

1. A rubber product, which consists in a vulcanized rubber material containing a sulfur vulcanizable rubber and a smaller amount of acenaphthylene.

2. A rubber material, consisting in a mixture containing a sulfur vulcanizable rubber and a smaller amount of acenaphthylene.

FRANCIS E. CISLAK.